United States Patent [19]
Crawford et al.

[11] Patent Number: 5,060,279
[45] Date of Patent: Oct. 22, 1991

[54] EXPERT SYSTEM USING PATTERN RECOGNITION TECHNIQUES

[75] Inventors: Thomas M. Crawford; Colin F. N. Cowan, both of Edinburgh, Scotland; Virgil N. Marton, Bath, England

[73] Assignee: Hewlett-Packard Company, Palo Alto, Calif.

[21] Appl. No.: 265,859

[22] PCT Filed: Apr. 10, 1986

[86] PCT No.: PCT/GB86/00199
§ 371 Date: Sep. 27, 1988
§ 102(e) Date: Sep. 27, 1988

[87] PCT Pub. No.: WO87/06371
PCT Pub. Date: Oct. 22, 1987

[51] Int. Cl.⁵ .............................. G06K 9/62
[52] U.S. Cl. .......................... 382/14; 382/8; 382/1; 364/513
[58] Field of Search ............ 382/14, 8, 1, 15, 57; 364/513, 580, 550, 551

[56] References Cited

U.S. PATENT DOCUMENTS

| | | | |
|---|---|---|---|
| 4,376,298 | 3/1983 | Sokol et al. | 364/580 |
| 4,449,240 | 5/1984 | Yoshida | 382/15 |
| 4,517,468 | 5/1985 | Kemper et al. | 364/551.01 |
| 4,635,214 | 1/1987 | Kasai et al. | 364/551.01 |
| 4,703,446 | 10/1987 | Momose | 364/580 |
| 4,739,492 | 4/1988 | Cochran | 364/551.01 |

OTHER PUBLICATIONS

Inspec. Abstract No. 86C010699, Insepc IEE (London) & IEE Coll. on "Adaptive Filters", Digest No. 76, Oct. 10, 1985, Crawford et al. Adaptive Pattern Recognition Applied To An Expert System For Fault Diagnosis In Telecommunications Equipment, pp. 10/1-8.

Inspec. Abstract No. 84C044315, Inspec IEE (London) & IEE Saraga Colloquium on Electronic Filters, May 21, 1984; Rutter et al., "The Timed Lattice—A New Approach To Fast Converging Equaliser Design", pp.VIII/1-5.

W. R. Simpson & C. S. Dowling, "WRAPLE: The Weighted Repair Assistance Program Learning Extension", IEEE Design & Test, vol. No. 2, Apr. 1986; pp. 66-73.

B. B. Dunning, "Self-Learning Data-Base For Automated Fault Localization", IEEE, 1979; pp. 155-157.

R. M. Stewart, "Expert Systems For Mechanical Fault Diagnosis", IEEE, 1985; pp. 295-300.

*Primary Examiner*—Michael Razavi

[57] ABSTRACT

An expert system having a processor which can receive input data and operate on it to produce data indicative of a parameter or parameters which are considered to define or represent the condition of equipment or a system to be diagnosed and which provides an adaptive pattern recognition facility which can be trained or instructed to recognize different combinations of input data as indicative of particular conditions of the equipment. The system is trained by coupling it initially to known good equipment into which definable faults are introduced. The adaptive pattern recognition facility has a series of sections with adjustable weight coefficients which are adjusted in accordance with a given algorithm as successive data combinations associated with the various faults are fed to the system. Once trained, the system can diagnose unknown equipment and provide outputs indicative of faults.

11 Claims, 4 Drawing Sheets

Key: D = Distance from origin
α = Angle of rotation
---- = Slicer threshold

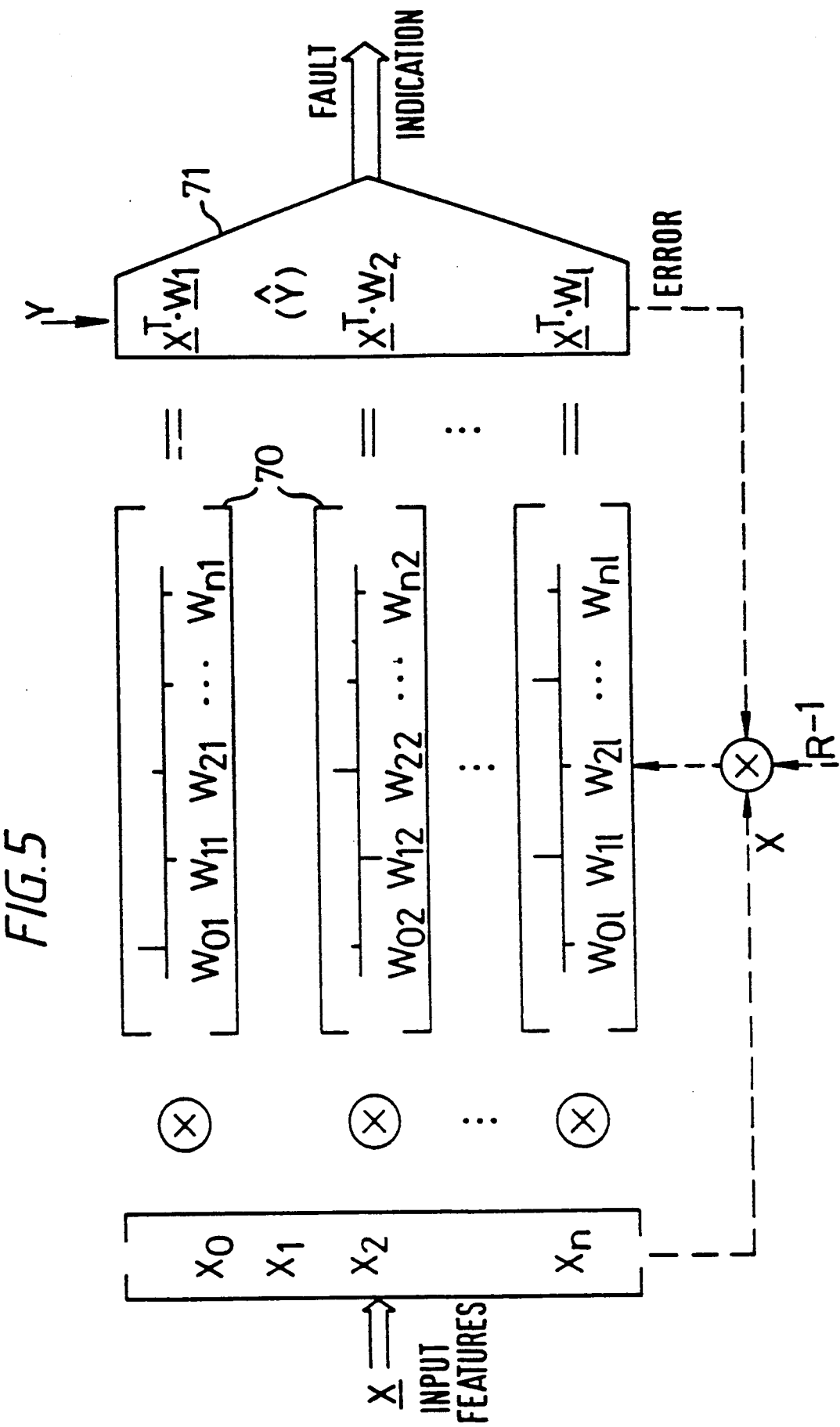

EXPERT SYSTEM USING PATTERN RECOGNITION TECHNIQUES

TECHNICAL FIELD

This invention relates to expert systems. Such systems can be used for monitoring and fault diagnosis in a wide variety of applications.

PRIOR ART

Conventional expert systems are usually operated on computers and are used in such applications such as medical diagnosis, geophysical prospecting, electronic equipment configuration and planning of maintenance and control strategies. Such systems are usually rule based systems in which decision making follows a tree-like configuration in which a yes or no type decision is made at each branch along the tree. Fault diagnosis involves relating patterns of symptoms to specific faults or to corresponding corrective courses of action. The conventional expert system involves acquisition of information through extensive discussions with technicians or engineers familiar with the equipment or system to be diagnosed. This acquisition of information is an extremely time consuming and costly process. Furthermore it sometimes, involves a user predicting the implications of faults in a theoretical way and it is doubtful whether this is practical as it involves design staff in work which can approach the complexity of the original system design process. There is thus a need for an expert system which is much simpler and less time consuming to evolve. The present invention is directed to the provision of such a system.

SUMMARY OF THE INVENTION

According to the present invention there is provided an expert system which can be used for fault diagnosis and maintenance purposes which comprises processing means which receive data relating to equipment or system to be diagnosed, where the processing means is arranged to manipulate input data in a given manner to produce data representative of a parameter or parameters which can indicate the condition of the equipment or system, characterised in that said processing means includes an adaptive pattern recognition facility in the form of an adaptive combiner, which is capable of instruction to recognize particular data combinations as representative of particular conditions whereby after instruction said processing means operates on input data to provide an indication of the condition of equipment or systems under diagnosis.

The input data can be fed to the processing means from the equipment or system under test or can input via a keyboard.

The system can be instructed by connecting it to an equipment or system which is known to have essentially no faults. Data from that equipment is fed to the expert system and the weights of the adaptive combiner are adjusted according to a recursive means squares technique. A known fault is then introduced into the equipment and data again fed to the system. The weights are again adjusted to form a best fit to the data already introduced using the same recursive means squares error technique. This process is carried out for different degrees of the known fault and at each stage the processor is instructed as to the degree and type of fault. This process can be repeated for different faults to generate a series of combiners each having a set of weights updated to form a best fit to the input data.

Once instructed in this way the system can then be used to receive data from equipment to be diagnosed. The data to be processed is applied to the adaptive combiner which generates an output indicative of any fault existing in the equipment. The output or outputs can be used to drive a visual display unit which can provide a visible indication of the type and degree of fault. In addition, outputs can be generated which indicate the action required to correct the fault.

BRIEF DESCRIPTION OF THE DRAWINGS

The invention will be described now by way of example only with particular reference to the accompanying drawings. In the drawings:

FIG. 5 illustrates the operation of an adaptive combiner of the invention.

PREFERRED EMBODIMENT OF THE INVENTION

Figure 1:
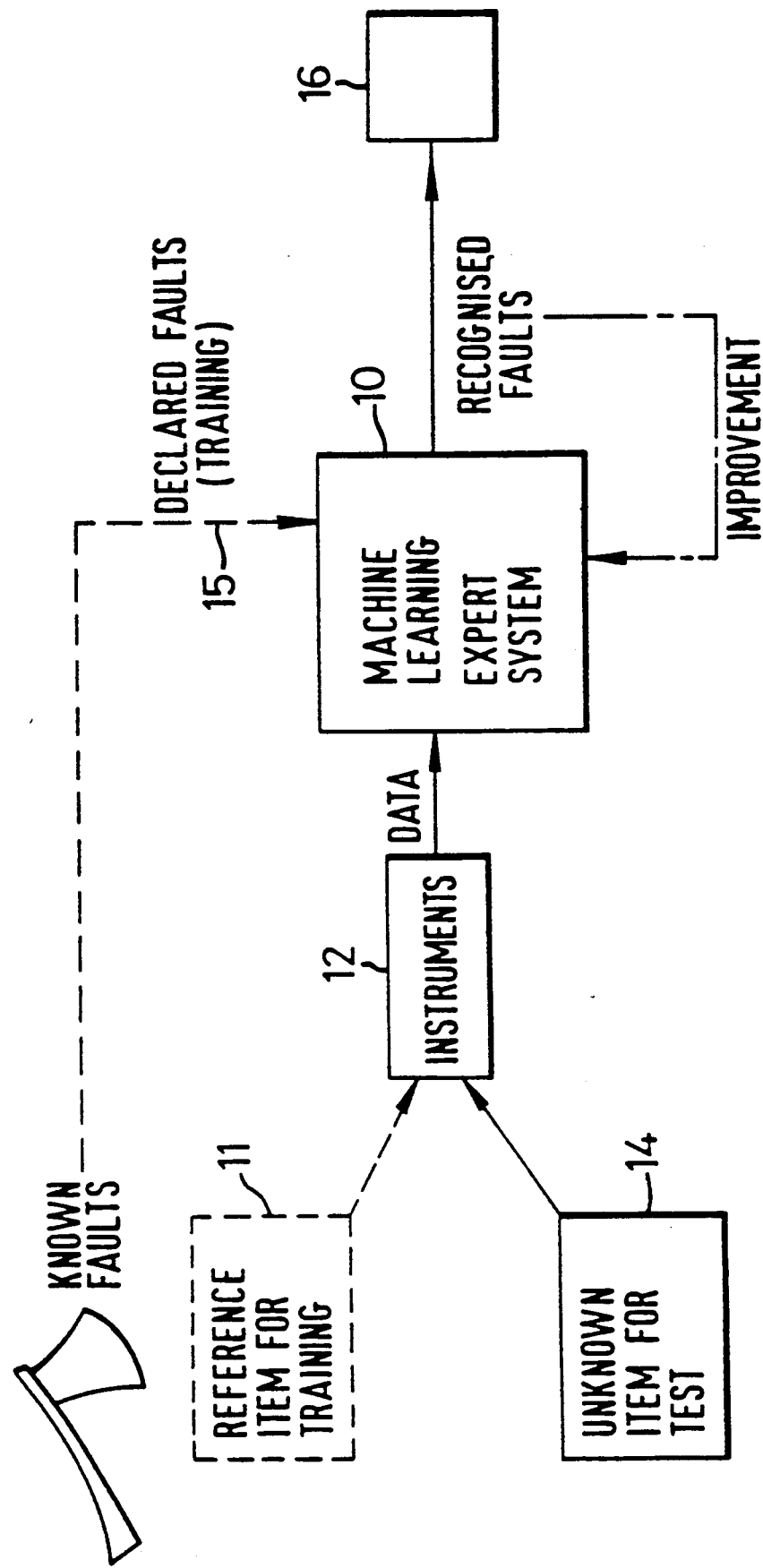
FIG. 1 is a block schematic diagram illustrating an expert system in accordance with the present invention.

FIG. 1 illustrates an expert system which can be used for fault diagnosis and is based upon a processor 10 which can be any type of microcomputer. The microcomputer has stored therein software which:

a) can take input data and operate on it so as to produce data indicative of a parameter or parameters which an operator considers can be used to define or represent the condition of equipment which is to be diagnosed, and b) provides an adaptive pattern recognition facility which can be trained or instructed to recognize different combinations of input data as indicative of particular conditions of the equipment. The adaptive pattern recognition facility includes an adaptive combiner in which adjustable coefficients or weights are combined with data values to produce one or more outputs. During training or instruction the weights or coefficients are adjusted using a recursive least squares error technique to provide a best fit for the input data.

The system of FIG. 1 is trained by connecting it to a known item of initially fault free equipment 11 if necessary by way of an instrument 12 which provides the input data. Data is input from the equipment 11 so that the system 10 initially recognizes the data pattern for that fault free equipment. Appropriate coefficients for a section of the adaptive combiner are generated and stored in designated locations in the memory of the microcomputer. A known fault is then induced in the equipment 11 and data is fed again to the system 10. The system is instructed (as shown schematically at 15 in FIG. 1) that this data is representative of a particular type and degree of fault and the coefficients of the adaptive combiner are adjusted by a recursive least squares error technique to provide a best fit to the data which has been input. This can be repeated for other data combinations which represent different degrees of that fault, with the coefficients of the combiner section being adjusted as each data combination is input. Other types of fault can also be induced and the data again fed to the system 10 to produce further sets of coefficients, one for each type of fault which is to be diagnosed. Thus the net result is a set of adaptive combiner sections each of which has a group of coefficients associated with a particular type of fault and each stored in the memory of the microcomputer. The particular data values which are fed to the system will be selected according to the application and the type of faults which are to be diagnosed. It will be appreciated that the microcomputer can have a keyboard for the inputting of such data.

Once the system has been trained in this way it can then be used to diagnose faults which may exist in equipment or systems under test. For example, an item of equipment 14 can be connected by the instrument 12 to the system 10. Data then is fed to the system 10 and, after initial processing, it is combined with the coefficients of the combiner sections to produce a series of output values which provide data indicative of any fault which exists in the item of equipment. The type of fault can be output on a visual display unit 16 associated with the microcomputer. Also, an indication of the corrective action which is necessary to overcome the fault can be provided.

In summary, one combiner section is created for each outcome (Fault) whose presence needs to be detected and measured. The combiner weights reflect the amount of correlation ($+VE$ or $-VE$) between the outcome whose presence this combiner section is measuring and the corresponding features. The combiner terms combine in a linear manner to measure the presence of an outcome. However, these terms may be any combination (e.g. Nth order multivariate hermite polynomials) of the original first order features. When the combiner is fully trained, the weights should have the same values as obtained through a process of multiple linear regression applied to all training examples. The merits of the recursive least squares (RLS) algorithm are: A high speed of convergence (compared to, for instance, a LMS algorithm) and the capability to handle non-orthogonal (inter-related) features. The adaptive combiner used in a pattern matching role performs a curve fitting function.

Figure 2:
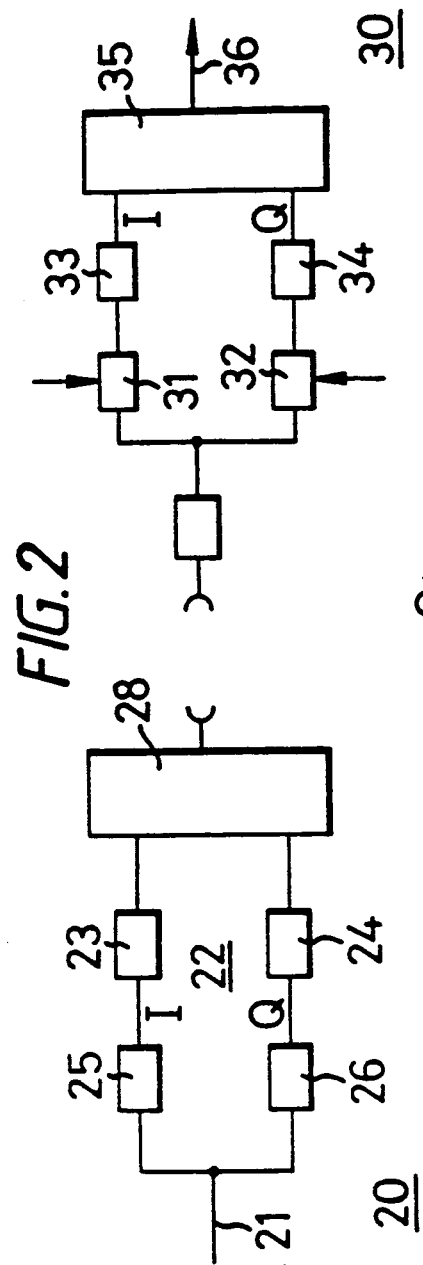
FIG. 2 is a block schematic diagram of a digital radio system.

A specific example of the way in which the expert system can be employed will now be described. It will be appreciated however that this is by no means the only application of the present system which can be used to diagnose a wide variety of systems or items of equipment in which pattern recognition techniques can be used to identify faults. The example to be described is that of a digital radio transmission arrangement. A schematic illustration of a digital radio link is given in FIG. 2. At a transmission station 20, data, which may be PCM data, on line 21 is applied to a modulating device 22. The modulating device 22 shown in FIG. 1 is designed to provide 16 QAM modulation and has two paths I and Q, one of which uses a sine wave and the other a cosine wave. Each path includes a four level modulator 25, 26 and this arrangement provides 16 possible modulation combinations for representing the digitally encoded data. The modulated signals are filtered in filters 23, 24 and transmitted from a transmitter 28 which may include a travelling wave tube.

Figure 3:
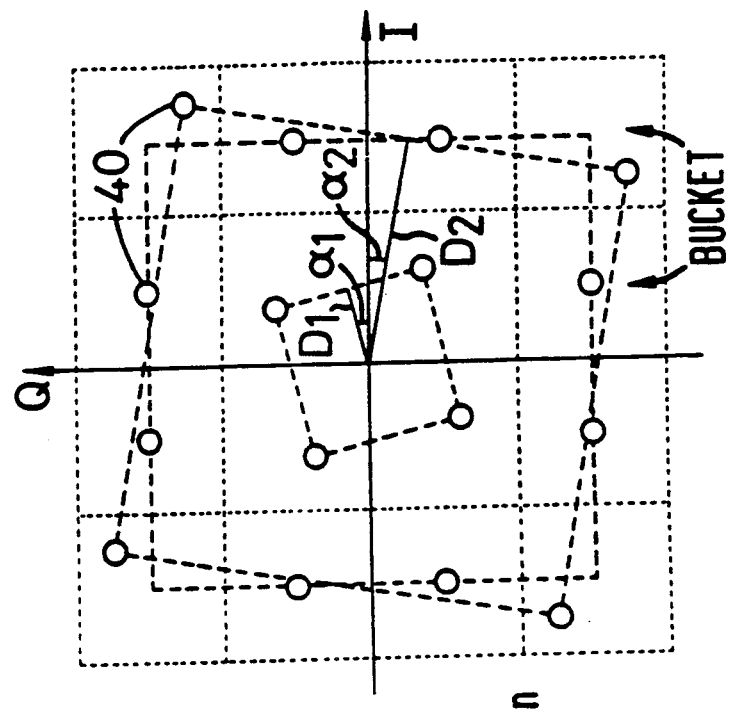
FIG. 3 shows a constellation type display for a digital radio system.

At a receiver 30 the transmitted signals are detected and filtered and then demodulated at demodulators 31, 32 by signals corresponding to the sine and cosine carriers. These signals are then filtered in filters 33, 34 and applied to a decision circuit 35 to reconstitute the digital data which is then output on line 36. There are known ways of analyzing digital radio transmissions. One of these is to construct a constellation which is an array of clusters of points on, for example, a cathode ray tube screen each of which corresponds to one of the modulations of the transmitted radio signals. In the case of 16 QAM an array of the type shown in FIG. 3 is obtained. The display is formed by sampling the recovered I and Q signals at a plurality of instants to form a large number of samples. These sampled values can be stored in digital form for further analysis. The array shown is for 16 QAM and comprises 16 clusters 40, one for each modulation state or combination. Each sample comprises an I value and a Q value. The I values extend along the X axis and the Q values along the Y axis. Each point in a cluster corresponds to a sample.

This type of array can be used to analyze a digital radio transmission If the transmission is functioning correctly then a regular non-distorted array will be generated. Faults in the transmission such as, for example, receiver carrier lock angle error or transmitter/-receiver quadrature angle error manifest themselves as distortions in the constellation. As explained, each sample is represented by an I value and a Q value and can be plotted in an X-Y co-ordinate system with the I values extending along the X axis and the Q values along the Y axis. Each sample is allocated according to its I and Q value to one of a number of groups. The number of groups corresponds to the number of modulation combinations provided by the modulation arrangement. In the case of 16 QAM there are 16 different combinations. Ideally there should be a regular array of 16 clusters with each cluster being made up of a number of points, each point corresponding to a sample. In practice the array will not be regular and may be distorted if there is a fault in existence.

The I and Q values of each sample can be digitized and represented by members in an X-Y co-ordinate system centered on the center of the constellation display.

It is therefore possible to evaluate statistical data relating to the constellation samples from the basic digitized X and Y values of the samples. Such data includes $\Sigma X$, $\Sigma Y$, $\Sigma X^2$, $\Sigma Y^2$, and $\Sigma X \times Y$ for each group of samples. An apparatus which can provide these values is described in United Kingdom Patent Application No. 8606572.

In the case of a digital radio transmission these values represent data which can be used to provide an indication of the condition of the transmission. From this data a number of features can be extracted or evaluated as follows. These features fall into two classes:

1) geometrical displacement of the relative positions of the means of the constellation clusters.

2) spreading of the individual clusters.

The first class can be described by the extension and rotation of line segments joining pairs of points.

The second class can be described by statistical variances and co-variances of the individual clusters.

Knowledge of the design of QAM digital radios suggests that class 1 distortions include:

a) unequal gap spacings of clusters on I and Q axes.

b) non orthogonal I and Q axes;

c) compression of the outer states of the constellation; and d) rotation of the outer constellation states relative to the inner constellation states.

(c) and (d) are non-linear distortions associated with AM-AM and AM-PM characteristics of the transmitter output amplifier.

Class 2 distortions can include high values of variances in I and Q axes and non-zero co-variants for points in I paired with delayed samples of points in Q on a cluster by cluster basis. These variance and co-variance terms relate to intersymbol interference, thermal noise and a-symmetrical pass band response.

It will be appreciated by those familiar with digital radio systems that data rep-resenting these conditions or features can be evaluated from the basic $\Sigma X$, $\Sigma Y$, $\Sigma X^2$, $\Sigma Y^2$, $\Sigma X.Y$ data input to the system. In an example of the present system a total of 15 salient features have been selected for the diagnosis.

Figure 4:
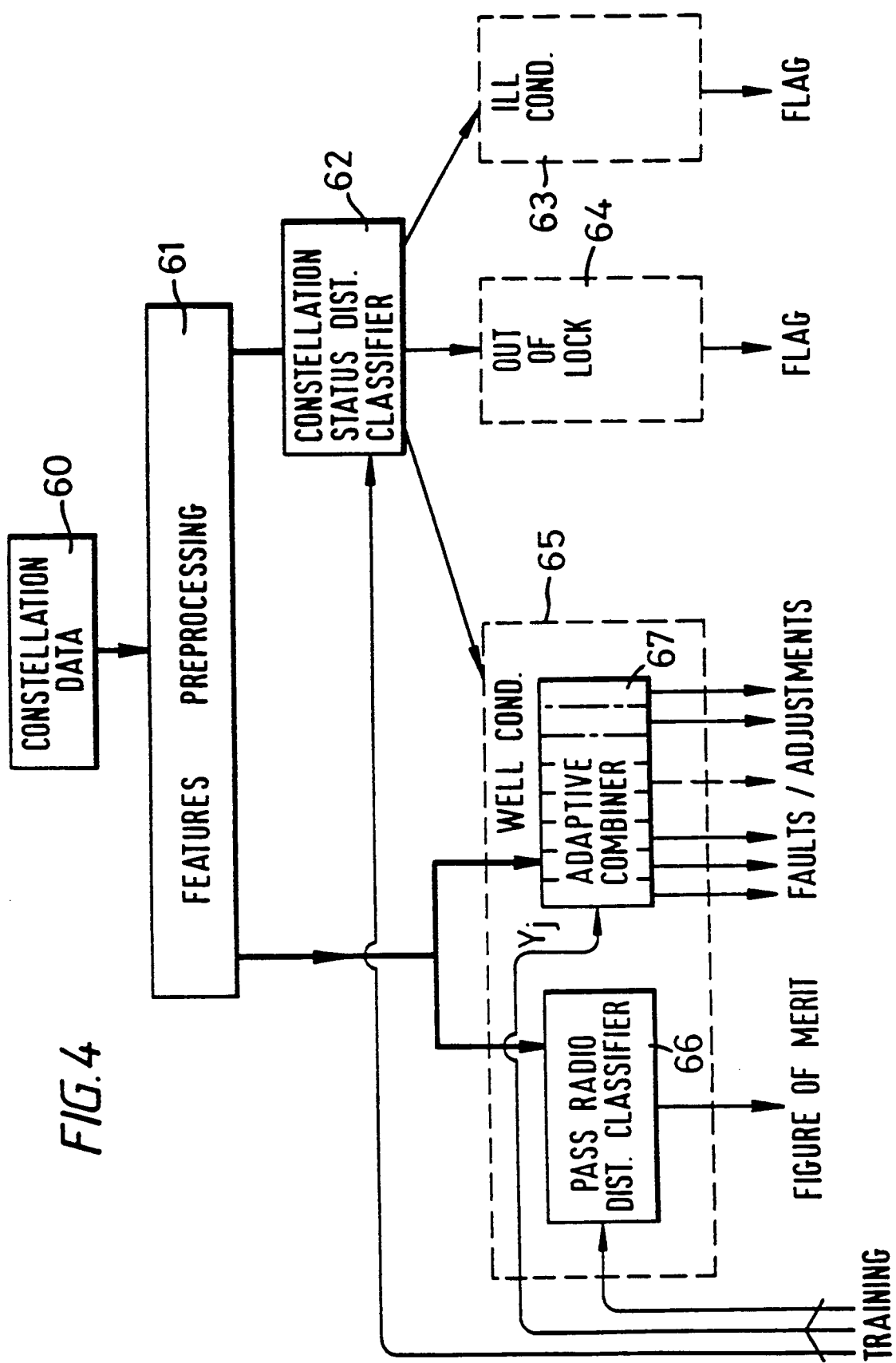
FIG. 4 is a block schematic diagram showing the basic software structure of one form of expert system in accordance with the present invention.

FIG. 4 illustrates a block diagram of the software structure which operates on the basic input data referred to above. The basic input data is supplied from a constellation analyzer 60 and fed to an initial processing stage indicated by block 61. This stage operates on the input data to provide data representing the 15 features referred to. Details of the operation are not given since it is not considered necessary for an understanding of the invention. They will however be apparent to a person skilled in the art of digital radios given the above description of the features. The data from stage 61 is then subjected to two adaptive classifications. The first represented by block 62 is a broad classification which either classifies the radio as ill-conditioned (block 63) or out of lock (block 64) or well-conditioned 65. If either of the first two conditions apply then block 65 does not operate. Block 65 only operates when the initial classification indicates that, although not fault free, the radio is reasonably well conditioned and any faults are such that they can be analyzed by the block 65. Broadly speaking block 65 comprises an adaptive combiner 67 which can be operated in a manner similar to that of an adaptive digital filter. It is instructed to recognize certain patterns of input data and to associate these with known fault conditions so that when diagnosing a digital radio it can produce output signals representative of that fault condition. These output signals can be applied to, for example, a visual display unit to provide a visual indication of the type of fault and the action necessary in order to correct the fault.

The adaptive combiner is trained as follows. The system is connected to a known good radio link. Data is extracted from the known good link and applied to the system. The block 61 operates on this data to provide data indicative of the 15 features referred to above. This data is applied to the adaptive combiner 65. The way in which the adaptive combiner operates can be considered by reference to FIG. 5. In this Figure Xo-Xn represents the data from the stage 61 which is representative of the relevant features, 70 represents adaptive combiner sections containing co-efficients or weights W and 71 an output section in which the product of the X values and the co-efficients are represented by Y. On the initial input of data from the good radio the system is instructed that this is representative of a good radio. Then a known fault is induced in the radio so that the X values change depending upon the type of fault induced. The combiner is fed with Y values which would be expected to arise for the particular fault and these Y values are compared with the calculated Y values obtained by combining the input X values with the stored co-efficients. In summary this can be expressed as follows. The estimated or calculated outcome is represented by $$\hat{Y}_i = X^t W_i$$

where the subscript i refers to the particular outcome referred to, X is the vector of the input features and $W_i$ is the classifier weight vector for outcome i. Thus, for a particular condition an error value is generated as follows:

$$e_j = Y_j - \hat{Y}_j$$

Each combiner section is then updated using an exponentially windowed recursive least squares adaptive algorithm. The algorithm is $$W_i(k+1) = W_i(k) + R^{-1}.X.error$$

where $R = X.X^T$ and $$R^{-1} = \begin{bmatrix} X_o^2 & X_o \cdot X_1 & \ldots & X_o \cdot X_n \\ X_1 \cdot X_o & X_1^2 & \ldots & X_1 \cdot X_n \\ \cdot & & & \\ \cdot & & & \\ \cdot & & & \\ X_n \cdot X_o & X_n \cdot X_1 & \ldots & X_n^2 \end{bmatrix}^{-1}$$

This algorithm operates to adjust the filter co-efficients so that the error value reduces. The particular algorithm is used because it provides rapid training thereby requiring fewer training examples, training time is independent of the degree of correlation between individual input features, it is an off-line computing application and the complexity of the Kalman algorithm does not provide a problem from either a time of computation or a numerical stability view point. This process is repeated for different degrees of a particular fault, and each time the weight values are adjusted in accordance with the algorithm.

Another fault is then induced and an additional set of co-efficients is generated associated with that fault. Varying degrees of fault are generated and appropriate input features X fed in and the weights again adjusted using the algorithm. This is repeated for each of the 15 faults so that a corresponding combiner section comprising a set of weights is generated for each such fault. These are stored within the processor memory.

It will be appreciated by those skilled in the art that the mathematical operations described with reference to FIG. 5 are essentially matrix calculations. Algorithms of the form given above are known in the art as techniques for their evaluation using microcomputers. Details can be found for example in "Adaptive Filters" by CFN Cowan and P. N. Grant published by Prentice Hall, 1985.

At the end of this instruction the system can then be used to diagnose an unknown radio. To do this the unknown radio is connected to the system as shown in FIG. 1. The X values are initially classified broadly by a block 62 to determine if it is a well conditioned radio. If it is, then the X values are combined with the stored co-efficients in a matrix calculation to produce output values represented on FIG. 5. These values are an indication of any faults on the digital radio and can be used to drive a visual display unit to provide an indication of that fault. In addition the system can also provide an indication of the action which is necessary in order to correct the fault.

The broad classification shown as block 62 is in essence a weighted distance classifier. It operates to classify the sample values in a multi-dimensional co-ordinate system and can be trained or instructed in a manner similar to that described for the combiner of that block 65. In the present example, the Mahalonobis distance is employed. Such distance classifiers are known and described for example in "Pattern Recognition" by Bow Sing-Tze, Marcel Dekker Inc., 1984.

In FIG. 4 the block 66 is another distance classifier which provides as an output a figure of merit. This is provided so that there will be a fault indication in the case where a fault occurs which the combiner 65 has not been trained to recognize.

We claim:

1. An expert system for fault diagnosis, comprising: processing means for receiving input data relating to a device or system to be diagnosed and manipulating said input data to produce output data representative of at least one parameter indicating the condition of said device or system, said processing means having adaptive pattern recognition means for recognizing certain patterns of input data and associating said patterns with known conditions, means for storing pattern data representing said known conditions during an instruction mode, and means for comparing input data from said device or system with said stored pattern data to determine the presence of said known conditions in said input data during a diagnostic mode; and
means for displaying a result of said comparison as said output data representative of said at least one parameter.

2. A system as in claim 1, further comprising a keyboard for inputting said input data.

3. A system as in claim 1, wherein said adaptive pattern recognition means comprises an adaptive combiner which assigns adjustable weights to data input during said instruction mode, said weights being stored by said pattern data storing means as said pattern data.

4. A system as in claim 3, further comprising means for adjusting said weights in accordance with a recursive least squares error technique to produce updated pattern data better fitting said input data, said pattern data storing means storing said updated pattern data as said pattern data.

5. A system as in claim 4, wherein said comparing means comprises data input during said diagnostic mode and said stored pattern data with expected data corresponding to data expected to arise for a device or system with the known conditions represented by said stored pattern data.

6. A system as in claim 1, wherein said displaying means includes a visual display unit which is responsive to said comparison results to provide said output data as a visible indication of a type and degree of fault of said device or system.

7. A system as in claim 6, wherein said output data indicates the action required to correct any diagnosed fault of said device or system.

8. An expert system for fault diagnosis, comprising:
means for receiving input data relating to a device or system to be diagnosed;
adaptive pattern recognition means for recognizing certain patterns of input data from said receiving means and associating said patterns with known conditions;
means for storing pattern data representing said known conditions during an instruction mode;
means for comparing diagnostic data from said device or system input during a diagnostic mode with said stored pattern data to determine the presence of said known conditions in said diagnostic data; and
means for displaying a result of said comparison as output data representative of at least one parameter indicating the condition of said device or system.

9. A method of diagnosing faults in a system, comprising the steps of:
(a) connecting a device or system with a predetermined number of known faults to an expert system;
(b) receiving low-fault data from said device or system with said predetermined number of known faults, adjusting first weights of an adaptive pattern recognition means until an output of said adaptive pattern recognition means closely approximates said low-fault data, and storing said first weights;
(c) introducing a known fault to said device or system;
(d) receiving fault data from said device or system with said introducing known fault and said predetermined number of known faults, adjusting second weights of said adaptive pattern recognition means until an output of said adaptive pattern recognition means closely approximates said low-fault data, and storing said second weights;
(e) connecting a device or system to be diagnosed to said expert system;
(f) applying input data from said device or system to be diagnosed to said adaptive pattern recognition means and adjusting third weights of said adaptive pattern recognition means until an output of said adaptive pattern recognition means closely approximates said low-fault data;
(g) comparing said third weights to said first and second weights to determine the presence of said known fault in said input data; and
(h) outputting the results of said comparison as output data representative of at least one parameter indicating the condition of said device or system.

10. A method as in claim 9, wherein said steps of adjusting the weights of said adaptive pattern recognition means includes the step of applying a recursive least squares error method to said output of said adaptive pattern recognition means.

11. A method as in claim 9, comprising the further steps of repeating said steps (c) and (d) for different degrees of said known fault and for different known faults to generate a series of said second weights representative of respective degrees of said known fault and said different known faults.

* * * * *